US011472405B2

(12) United States Patent
Vassilovski et al.

(10) Patent No.: US 11,472,405 B2
(45) Date of Patent: Oct. 18, 2022

(54) METHOD AND APPARATUS RELATED TO INTRA-LANE POSITION DATA INDICATIVE OF A LATERAL DISTANCE TO A LANE REFERENCE POINT

(71) Applicant: QUALCOMM Incorporated, San Diego, CA (US)

(72) Inventors: Dan Vassilovski, Del Mar, CA (US); Hong Cheng, Bridgewater, NJ (US); Shailesh Patil, San Diego, CA (US); Richard Reid Hovey, Branchburg, NJ (US); Arjun Bharadwaj, Poway, CA (US); Sudhir Kumar Baghel, Hillsborough, NJ (US); Jose Edson Vargas, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 16/666,010

(22) Filed: Oct. 28, 2019

(65) Prior Publication Data
US 2020/0207343 A1 Jul. 2, 2020

Related U.S. Application Data

(60) Provisional application No. 62/786,322, filed on Dec. 28, 2018.

(51) Int. Cl.
*B60W 30/12* (2020.01)
*G05D 1/00* (2006.01)
(Continued)

(52) U.S. Cl.
CPC ........... *B60W 30/12* (2013.01); *G05D 1/0088* (2013.01); *G05D 1/0231* (2013.01);
(Continued)

(58) Field of Classification Search
CPC ............ B60W 30/12; B60W 2554/801; G05D 1/0088; G05D 1/0231; G05D 1/0287;
(Continued)

(56) References Cited

U.S. PATENT DOCUMENTS 9,842,500 B1 * 12/2017 Prasad .................... G08G 1/162
2016/0368534 A1 * 12/2016 Harda .................. B62D 15/025
(Continued)

FOREIGN PATENT DOCUMENTS

DE 102012210344 A1 * 12/2013 ............. G08G 1/167
DE 102012210344 A1 12/2013

OTHER PUBLICATIONS

International Search Report and Written Opinion—PCT/US2019/058614—ISA/EPO—dated Feb. 14, 2020.

*Primary Examiner* — Abby Y Lin
*Assistant Examiner* — Hossam M Abd El Latif
(74) *Attorney, Agent, or Firm* — Muncy, Geissler, Olds & Lowe, P.C.

(57) ABSTRACT

In an aspect, a vehicle apparatus of a vehicle obtains, based on sensor data from one or more vehicle sensors communicatively coupled to the vehicle, intra-lane position data relative to the vehicle, the intra-lane position data indicating at least one lateral distance between at least one side of a primary vehicle and at least one lane reference point. The vehicle apparatus transmits the intra-lane position data to one or more neighboring entities. In another aspect, a vehicle management device obtains intra-lane position data that indicates at least one lateral distance between at least one side of at least one observed vehicle of a plurality of neighboring vehicles and at least one lane reference point, and instructs at least one vehicle of the plurality of neighboring vehicles to perform one or more actions based on the intra-lane position data.

30 Claims, 15 Drawing Sheets

(51) Int. Cl.
  *G05D 1/02*    (2020.01)
  *G08G 1/16*    (2006.01)
  *H04W 4/44*    (2018.01)
  *H04W 4/46*    (2018.01)

(52) U.S. Cl.
  CPC ............ *G05D 1/0287* (2013.01); *H04W 4/44*
           (2018.02); *B60W 2554/801* (2020.02)

(58) Field of Classification Search
  CPC ........ G08G 1/163; G08G 1/164; G08G 1/166;
           G08G 1/167; H04W 4/44; H04W 4/46
  USPC .......................................................... 701/23
  See application file for complete search history.

(56) References Cited

U.S. PATENT DOCUMENTS

| | | | |
|---|---|---|---|
| 2017/0291608 A1* | 10/2017 | Engel ................... | B60W 40/04 |
| 2017/0358211 A1 | 12/2017 | Prasad et al. | |
| 2018/0053404 A1* | 2/2018 | Horita ................... | G08G 1/163 |
| 2019/0204108 A1* | 7/2019 | Benincasa .............. | G08G 1/167 |

\* cited by examiner

METHOD AND APPARATUS RELATED TO INTRA-LANE POSITION DATA INDICATIVE OF A LATERAL DISTANCE TO A LANE REFERENCE POINT

CROSS-REFERENCE TO RELATED APPLICATIONS

The present Application for Patent claims the benefit of Provisional Patent Application No. 62/786,322 entitled "METHOD AND APPARATUS RELATED TO INTRA-LANE POSITION DATA INDICATIVE OF A LATERAL DISTANCE TO A LANE REFERENCE POINT" filed Dec. 28, 2018, and assigned to the assignee hereof and hereby expressly incorporated herein by reference in its entirety.

INTRODUCTION

Aspects of this disclosure relate generally to intra-lane position data indicative of a lateral distance to a lane reference point.

Modern motor vehicles are increasingly incorporating technology that helps drivers avoid drifting into adjacent lanes or making unsafe lane changes (e.g., Lane Departure Warning (LDW)), or that warns drivers of other vehicles behind them when they are backing up, or that brakes automatically if a vehicle ahead of them stops or slows suddenly (e.g., Forward Collision Warning (FCW)), among other things are summarized as Automated Driver-Assistance Systems (ADAS). The continuing evolution of automotive technology (e.g., motor vehicles such as trucks, motorcycles, cars, etc.) aims to deliver even greater safety benefits, and ultimately deliver fully Automated Driving Systems (ADS) that can handle the entire task of driving without the need for user intervention.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any specific aspect. Accordingly, the following summary has the sole purpose to present certain concepts relating to one or more aspects relating to the mechanisms disclosed herein in a simplified form to precede the detailed description presented below.

An aspect is directed to a method of operating a vehicle apparatus of a vehicle, comprising obtaining, based on sensor data from one or more vehicle sensors communicatively coupled to the vehicle, intra-lane position data relative to the vehicle, the intra-lane position data indicating at least one lateral distance between at least one side of a primary vehicle and at least one lane reference point, and transmitting the intra-lane position data to one or more neighboring entities.

Another aspect is directed to a method of operating a vehicle management device, comprising obtaining intra-lane position data that indicates at least one lateral distance between at least one side of at least one observed vehicle of a plurality of neighboring vehicles and at least one lane reference point, and instructing at least one vehicle of the plurality of neighboring vehicles to perform one or more actions based on the intra-lane position data.

Another aspect is directed to a vehicle apparatus of a vehicle, comprising a memory, at least one communications interface, one or more vehicle sensors, and at least one processor communicatively coupled to the memory, the at least one communications interface, and the one or more vehicle sensors, the at least one processor configured to obtain, based on sensor data from one or more vehicle sensors communicatively coupled to the vehicle, intra-lane position data relative to the vehicle, the intra-lane position data indicating at least one lateral distance between at least one side of a primary vehicle and at least one lane reference point, and transmit the intra-lane position data to one or more neighboring entities.

Another aspect is directed to vehicle apparatus of a vehicle, comprising means for obtaining, based on sensor data from one or more vehicle sensors communicatively coupled to the vehicle, intra-lane position data relative to the vehicle, the intra-lane position data indicating at least one lateral distance between at least one side of a primary vehicle and at least one lane reference point, and means for transmitting the intra-lane position data to one or more neighboring entities.

Another aspect is directed to a non-transitory computer-readable medium containing instructions stored thereon, which, when executed by a vehicle apparatus of a vehicle, cause the vehicle apparatus to perform operations, the instructions comprising at least one instruction to cause the vehicle apparatus to obtain, based on sensor data from one or more vehicle sensors communicatively coupled to the vehicle, intra-lane position data relative to the vehicle, the intra-lane position data indicating at least one lateral distance between at least one side of a primary vehicle and at least one lane reference point, and at least one instruction to cause the vehicle apparatus to obtain transmit the intra-lane position data to one or more neighboring entities.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1A:
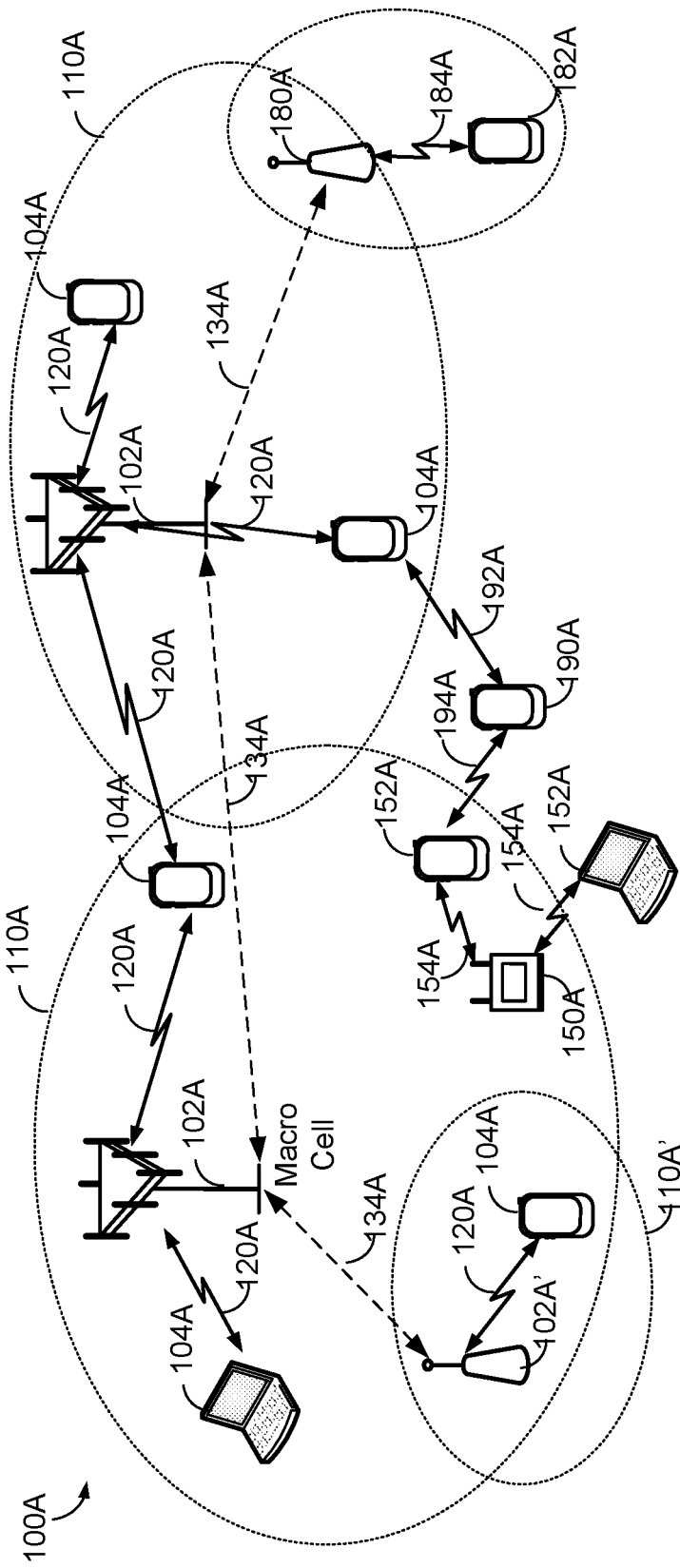
FIG. 1A illustrates an exemplary wireless communications system, according to various aspects.

Aspects of the disclosure relate generally to autonomous or semi-autonomous driving techniques, and more specifically, to a method and apparatus related to intra-lane position data indicative of a lateral distance to a lane reference point. In an aspect, a vehicle communicates intra-lane position data to one or more neighboring entities (e.g., one or more nearby or neighboring vehicles, one or more nearby or neighboring roadside units (RSUs), etc.) that indicates at least one lateral distance between at least one side of a primary vehicle and at least one lane reference point (e.g., a lane edge, a curb, a rumble strip, a median, a lane divider, a cone, etc.). The vehicle may optionally implement one or more actions (e.g., achieving or maintaining a safe inter-vehicle lateral spacing or distance, etc.) in association with one or more neighboring vehicles based at least in part upon the intra-lane position data. In another aspect, a vehicle management device (e.g., a vehicle, an RSU, etc.) obtains (e.g., via its own measurements and/or via communications from one or more vehicles) intra-lane position data that indicates at least one lateral distance between at least one side of at least one observed vehicle of a plurality of neighboring vehicles and at least one lane reference point. The vehicle management device instructs at least one vehicle (e.g., one of the observed vehicles, the vehicle management device itself if the vehicle management device corresponds to one of neighboring vehicles, etc.) of the plurality of neighboring vehicles to perform one or more actions (e.g., achieving or maintaining a safe lateral inter-vehicle spacing or distance, etc.) based on the intra-lane position data.

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

According to various aspects, FIG. 1A illustrates an exemplary wireless communications system 100A. The wireless communications system 100A (which may also be referred to as a wireless wide area network (WWAN)) may include various base stations 102A and various UEs 104A. The base stations 102A may include macro cells (high power cellular base stations) and/or small cells (low power cellular base stations), wherein the macro cells may include Evolved NodeBs (eNBs), where the wireless communications system 100A corresponds to an LTE network, or gNodeBs (gNBs), where the wireless communications system 100A corresponds to a 5G network or a combination of both, and the small cells may include femtocells, picocells, microcells, etc.

The base stations 102A may collectively form a Radio Access Network (RAN) and interface with an Evolved Packet Core (EPC) or Next Generation Core (NGC) through backhaul links. In addition to other functions, the base stations 102A may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102A may communicate with each other directly or indirectly (e.g., through the EPC/NGC) over backhaul links 134A, which may be wired or wireless.

The base stations 102A may wirelessly communicate with the UEs 104A. Each of the base stations 102A may provide communication coverage for a respective geographic coverage area 110A. In an aspect, although not shown in FIG. 1A, geographic coverage areas 110A may be subdivided into a plurality of cells (e.g., three), or sectors, each cell corresponding to a single antenna or array of antennas of a base station 102A. As used herein, the term "cell" or "sector" may correspond to one of a plurality of cells of a base station 102A, or to the base station 102A itself, depending on the context.

While neighboring macro cell geographic coverage areas 110A may partially overlap (e.g., in a handover region), some of the geographic coverage areas 110A may be substantially overlapped by a larger geographic coverage area 110A. For example, a small cell base station 102A' may have a geographic coverage area 110A' that substantially overlaps with the geographic coverage area 110A of one or more macro cell base stations 102A. A network that includes both small cell and macro cells may be known as a heterogeneous network. A heterogeneous network may also include Home eNBs (HeNBs), which may provide service to a restricted group known as a closed subscriber group (CSG). The communication links 120A between the base stations 102A and the UEs 104A may include uplink (UL) (also referred to as reverse link) transmissions from a UE 104A to a base station 102A and/or downlink (DL) (also referred to as forward link) transmissions from a base station 102A to a UE 104A. The communication links 120A may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100A may further include a wireless local area network (WLAN) access point (AP) 150A in communication with WLAN stations (STAs) 152A via communication links 154A in an unlicensed frequency spectrum (e.g., 5 GHz). When communicating in an unlicensed frequency spectrum, the WLAN STAs 152A and/or the WLAN AP 150A may perform a clear channel assessment (CCA) prior to communicating in order to determine whether the channel is available.

The small cell base station 102A' may operate in a licensed and/or an unlicensed frequency spectrum. When operating in an unlicensed frequency spectrum, the small cell base station 102A' may employ LTE or 5G technology and use the same 5 GHz unlicensed frequency spectrum as used by the WLAN AP 150A. The small cell base station 102A', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100A may further include a mmW base station 180A that may operate in mmW frequencies and/or near mmW frequencies in communication with a UE 182A. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave (mmW). Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180A may utilize beamforming 184A with the UE 182A to compensate for the extremely high path loss and short range. Further, it will be appreciated that in alternative configurations, one or more base stations 102A may also transmit using mmW or near mmW and beamforming. Accordingly, it will be appreciated that the foregoing illustrations are merely examples and should not be construed to limit the various aspects disclosed herein.

The wireless communications system 100A may further include one or more UEs, such as UE 190A, that connects indirectly to one or more communication networks via one or more device-to-device (D2D) peer-to-peer (P2P) links. In the embodiment of FIG. 1A, UE 190A has a D2D P2P link 192A with one of the UEs 104A connected to one of the base stations 102A (e.g., through which UE 190A may indirectly obtain cellular connectivity) and a D2D P2P link 194A with WLAN STA 152A connected to the WLAN AP 150A (through which UE 190A may indirectly obtain WLAN-based Internet connectivity). In an example, the D2D P2P links 192A-194A may be supported with any well-known D2D radio access technology (RAT), such as LTE Direct (LTE-D), WiFi Direct (WiFi-D), BLUETOOTH, and so on.

There are six levels that have been defined to achieve full automation. At Level 0, the human driver does all the driving. At Level 1, an Advanced Driver Assistance System (ADAS) on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human occupant need not pay attention in those circumstances. At Level 5, an ADS on the vehicle can do all the driving in all circumstances. The human occupants are just passengers and need never be involved in driving.

These and other safety technologies use a combination of hardware (sensors, cameras, and radar) and software to help vehicles identify certain safety risks so they can warn the driver to act (in the case of an ADAS), or act themselves (in the case of an ADS), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize radio frequency (RF) waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

Figure 1B:
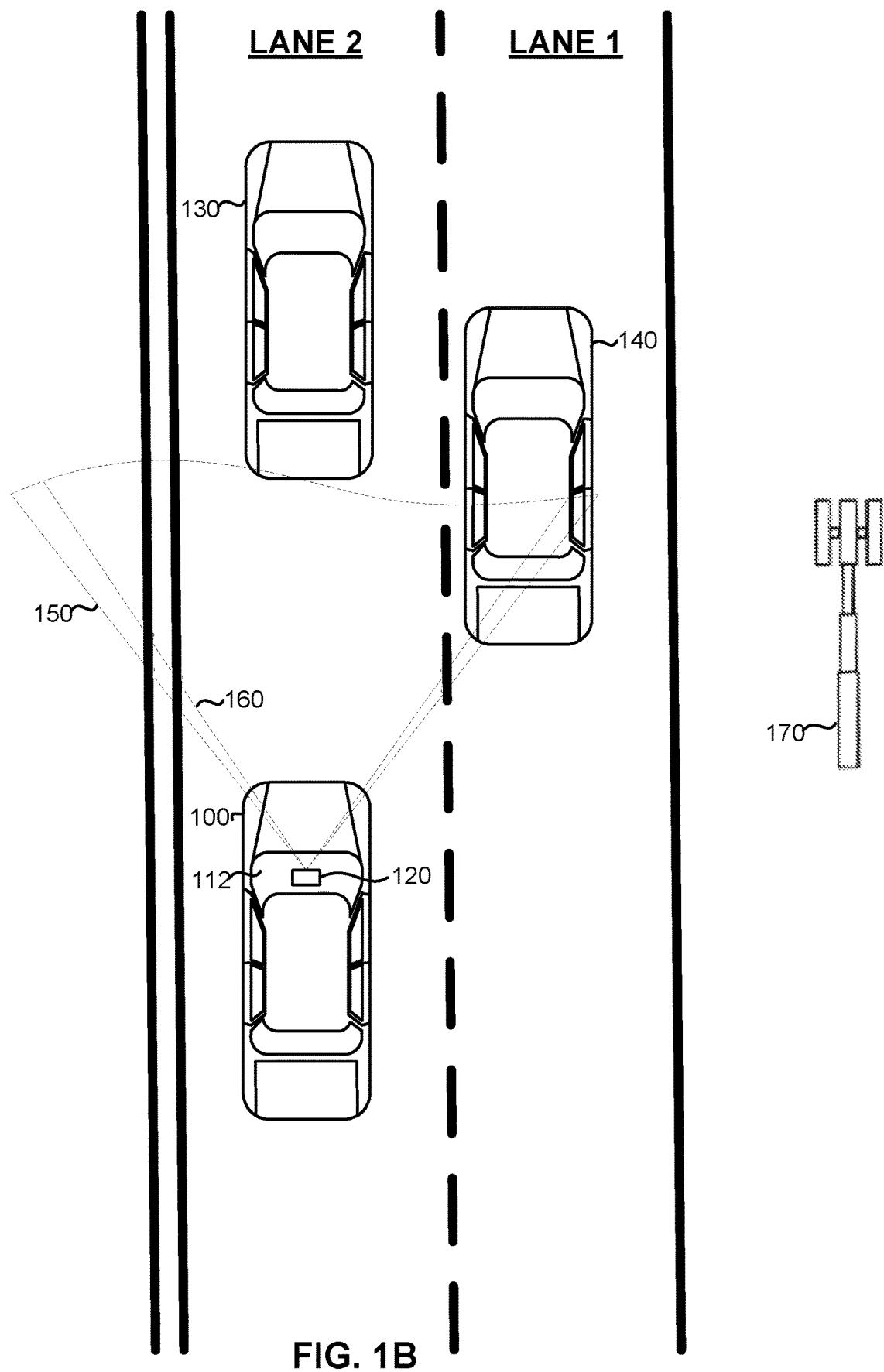
FIG. 1B is a top view of a vehicle employing an integrated radar-camera sensor behind the windshield, according to various aspects of the disclosure.

Referring now to FIG. 1B, a vehicle 100 is illustrated that includes a radar-camera sensor module 120 located in an interior compartment of the vehicle 100 behind a windshield 112. The radar-camera sensor module 120 includes a radar sensor component configured to transmit radar signals through the windshield 112 in a horizontal coverage zone 150 (shown by dashed lines), and receive reflected radar signals that are reflected off of any objects within the coverage zone 150. The radar-camera sensor module 120 further includes a camera component for capturing images based on light waves that are seen and captured through the windshield 112 in a horizontal coverage zone 160 (shown by dashed lines).

Although FIG. 1B illustrates an example in which the radar sensor component and the camera component are collocated components in a shared housing, as will be appreciated, they may be separately housed in different locations within the vehicle 100. For example, the camera part of the radar-camera sensor module 120 may be located as shown in FIG. 1B, and the radar sensor part of the radar-camera sensor module 120 may be located in the grill or front bumper of the vehicle 100. Additionally, although FIG. 1B illustrates the radar-camera sensor module 120 located behind the windshield 112, it may instead be located in a rooftop sensor array, or elsewhere. Further, although FIG. 1B illustrates only a single radar-camera sensor module 120, as will be appreciated, the vehicle 100 may have multiple radar-camera sensor modules 120 pointed in different directions (to the sides, the front, the rear, etc.). The various radar-camera sensor modules 120 may be under the "skin" of the vehicle (e.g., behind the windshield 112, door panels, bumpers, grills, etc.) or within a rooftop sensor array.

The radar-camera sensor module 120 may detect one or more (or none) objects relative to the vehicle 100. In the example of FIG. 1B, there are two objects, vehicles 130 and 140, within the horizontal coverage zones 150 and 160 that the radar-camera sensor module 120 can detect. The radar-camera sensor module 120 may estimate parameters of the detected object(s), such as the position, range, direction, speed, size, classification (e.g., vehicle, pedestrian, road sign, etc.), and the like. The radar-camera sensor module 120 may be employed onboard the vehicle 100 for automotive safety applications, such as adaptive cruise control (ACC), forward collision warning (FCW), collision mitigation or avoidance via autonomous braking, lane departure warning (LDW), and the like. More specifically, the radar-camera sensor module 120 may be part of an onboard unit (OBU) (alternatively referred to as an on-board computer (OBC)), which is described in more detail below with respect to FIG. 2.

In one or more aspects, collocating the camera and radar sensor permits these components to share electronics and signal processing, and in particular, enables early radar-camera data fusion. For example, the radar sensor and camera may be integrated onto a single board. A joint radar-camera alignment technique may be employed to align both the radar sensor and the camera. However, collocation of the radar sensor and camera is not required to practice the techniques described herein.

In the aspect of FIG. 1B, vehicles 100, 130 and 140 are traveling in the same direction along a road in proximity to a roadside unit (RSU) 170, whereby vehicle 140 is in a first lane ("Lane 1") and vehicles 100 and 130 are in a second lane ("Lane 2"). The RSU 170 may correspond to one of a plurality of fixed reference nodes that are deployed along various roadways. RSUs may form part of a Vehicular ad-hoc networks (VANET) and may be configured for direct communication with vehicles via a vehicle-to-vehicle (V2V) communications protocol, while further being connected to one or more communication networks (e.g., wireless communications system 100A of FIG. 1A) via a wired or wireless backhaul connection. In an example, the RSU 170 may correspond to a small cell or an access point as described above with respect to the wireless communications system 100A of FIG. 1A. In some aspects, the RSU 170 may be implemented as a vehicle management entity that manages (or coordinates actions) between the neighboring vehicles 100, 130 and 140. The RSU 170 may be equipped with various functionalities, including but not limited to short-range communications (e.g., 5.9 GHz Direct Short Range Communications (DSRC), non-DSRC technologies as means of facilitating communication for vehicle-to-vehicle (V2V) and/or vehicle-to-infrastructure (V2I) applications, etc.), location-detection (e.g., GPS, etc.), communicative support functions (e.g., a WiFi hotspot, etc.), navigational support functions (e.g., local map data, Signal Phase and Timing (SPaT) information for intersection-based applications and localized roadway warnings, etc.), and so on.

Referring to FIG. 1B, in one aspect, the vehicles 130 and 140 may be similarly provisioned with respective radar-camera sensor modules 120, and may be capable of direct vehicle-to-vehicle (V2V) communication via respective communication interfaces. However, it is also possible for only one or even none of vehicles 130 and 140 to be equipped with such 'smart' vehicle technology.

Figure 2:
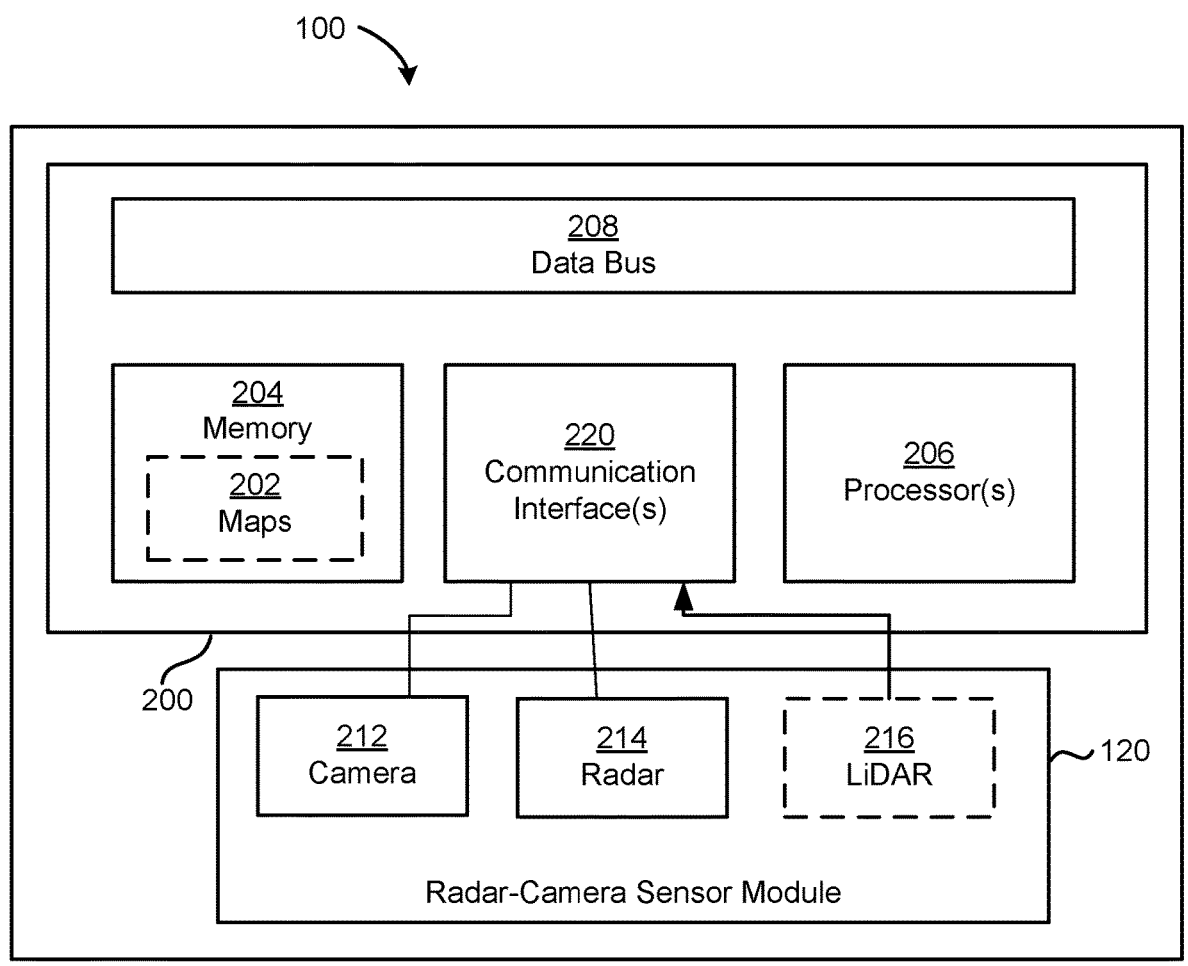
FIG. 2 illustrates an on-board unit (OBU) computer architecture, according to various aspects of the disclosure.

FIG. 2 illustrates an on-board unit (OBU) 200 of the vehicle 100 of FIG. 1B, according to various aspects. In an aspect, the OBU 200 may be referred to herein as a vehicle apparatus, and may be part of an ADAS or ADS. The OBU 200 includes a non-transitory computer-readable storage medium, i.e., memory 204, and one or more processors 206 in communication with the memory 204 via a data bus 208. The memory 204 includes one or more storage modules storing computer-readable instructions executable by the processor(s) 206 to perform the functions of the OBU 200 described herein.

One or more radar-camera sensor modules 120 are coupled to the OBU 200 (only one is shown in FIG. 2 for simplicity). In some aspects, the radar-camera sensor module 120 includes at least one camera 212 (e.g., a forward-facing camera as shown via the coverage zone 160 in FIG. 1B), at least one radar sensor 214, and an optional Light Detection and Ranging (LiDAR) sensor 216. While not shown expressly, the radar-camera sensor module 120 may further optionally include a Sound Navigation and Ranging (SONAR) detector, a Radio Detection and Ranging (RADAR) detector, and/or an infrared detector. The OBU 200 also includes one or more communication interfaces 220 connecting the processor(s) 206, by way of the data bus 208, to the radar-camera sensor module 120, other vehicle subsystems (not shown), and in some cases, wireless communication networks (not shown), such as wireless local area networks (WLANs), global positioning systems (GPS) networks, cellular telecommunication networks, and the like. In an example, the one or more communication interfaces 220 may include a network interface (e.g., a wireless LTE, 5G NR, a wired backhaul connection to a core network component, etc.) to connect to one or more network access points or base stations (e.g., cellular base stations, RSUs, etc.), and a second interface (e.g., V2X, 5.9 GHz DSRC, etc.) to connect directly to nearby (or neighboring) vehicles. In an example, V2X connections may be implemented via unicast, multicast or broadcast protocols. The various V2X connections described below may be implemented in accordance with any one of these protocols.

In an aspect, the OBU 200 may utilize the communication interfaces 220 to download one or more maps 202 that can then be stored in memory 204 and used for vehicle navigation. Map(s) 202 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by vehicle 100. Map(s) 202 may also provide electronic horizon predictive awareness, which enables the vehicle 100 to know what lies ahead.

In an aspect, the camera 212 may capture image frames of the scene within the viewing area of the camera 212 (as illustrated in FIG. 1B as horizontal coverage zone 160) at some periodic rate. Likewise, the radar sensor 214 may capture radar frames of the scene within the viewing area of the radar sensor 214 (as illustrated in FIG. 1B as horizontal coverage zone 150) at some periodic rate. The periodic rates at which the camera 212 and the radar sensor 214 capture their respective frames may be the same or different. Each camera and radar frame may be timestamped. Thus, where the periodic rates are different, the timestamps can be used to select simultaneously, or nearly simultaneously, captured camera and radar frames for further processing (e.g., fusion).

Figure 3:
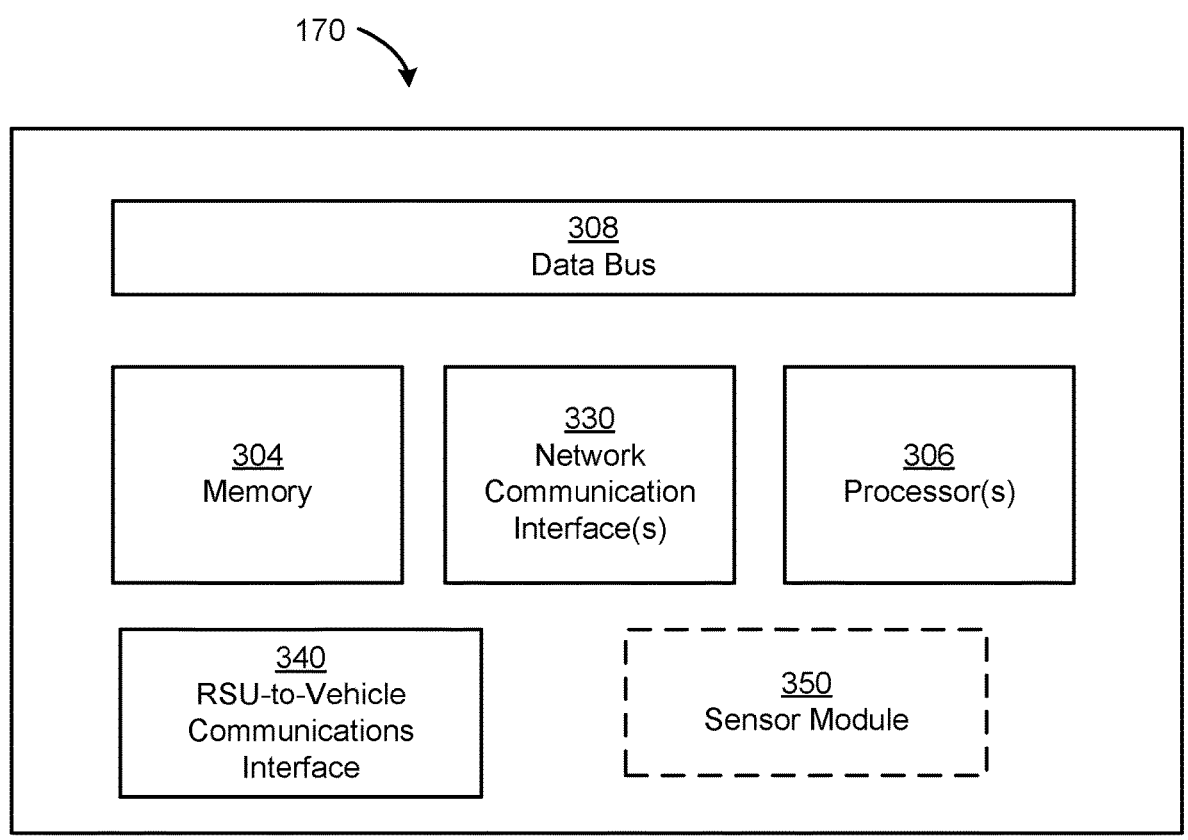
FIG. 3 illustrates components of a Road Side Unit (RSU) according to various aspects.

FIG. 3 illustrates components of the RSU 170 of FIG. 1B according to various aspects. In an aspect, the RSU 170 is configured with a memory 304, and one or more processors 306 in communication with the memory 304 via a data bus 308. The RSU 170 further includes one or more network communication interfaces 330, which may be used to communicatively couple the RSU 170 to a communications network (e.g., a macro base station, another RSU, a core network component, etc.) via a wired or wireless backhaul connection. The RSU 170 is further configured with a RSU-to-vehicle communications interface 340 (e.g., V2X, 5.9 GHz DSRC, etc.) for direct RSU-to-vehicle communication. The RSU 170 is also optionally configured with a sensor module 350, which may be configured with any combination of camera(s), radar, LiDAR, GPS, etc. As will be described below in more detail, in certain aspects the sensor module 350 may be used to scan the locations of a set of neighboring vehicles to obtain intra-lane position data that replaces and/or supplements intra-lane position data measured or derived by one or more of the neighboring vehicles.

Figure 4:
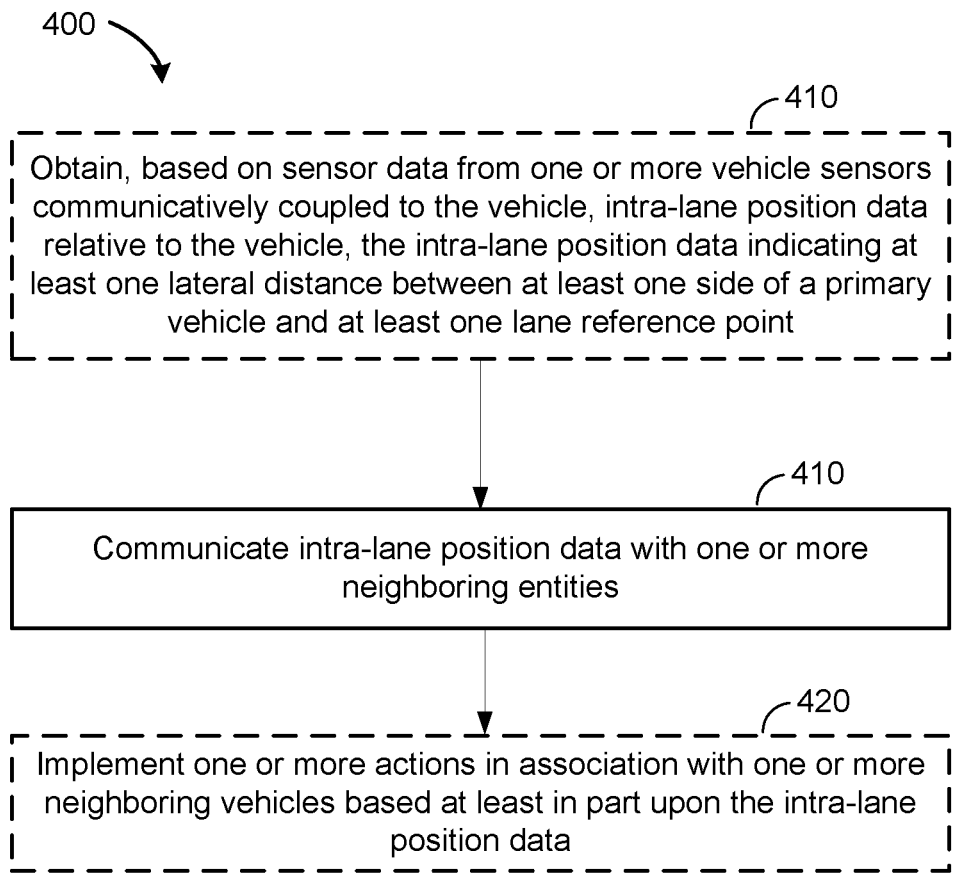
FIG. 4 is a flow diagram illustrating an example method of intra-lane position data communication in accordance with an aspect of the present disclosure.

FIG. 4 is a flow diagram illustrating an example method 400 of intra-lane position data communication in accordance with an aspect of the present disclosure. The method 400 may be performed, for example, by a vehicle (or more specifically, by a computer or OBU on-board a vehicle), such as the vehicle 100 described above with respect to FIGS. 1B-2.

Referring to FIG. 4, at block 405, the vehicle (e.g., based on sensor data from one or more vehicle sensors of the radar-camera sensor module 120, etc.) optionally obtains intra-lane position data relative to the vehicle, the intra-lane position data indicating at least one lateral distance between at least one side of a primary vehicle and at least one lane reference point. In some designs, block 405 is optional because the intra-lane position data may alternatively be received from an external source (e.g., a neighboring entity such as another vehicle or RSU), as will be described below in more detail. The 'primary' vehicle at block 405 may correspond to the vehicle that performed block 410 in some aspects, i.e., the vehicle may determine its own relative intra-lane position data. However, it is also possible for the vehicle to receive intra-lane position data for another vehicle, in which case the other vehicle is the 'primary' vehicle. In some designs, the intra-lane position data may be received from an external source via a pull protocol (e.g., in response to a request for the intra-lane position data that is sent from the vehicle to the external source). In other designs, the intra-lane position data may be received from an external source via a push protocol (e.g., without an express request or solicitation from the vehicle).

Referring to block 405 of FIG. 4, in an example, application-layer standards (e.g., SAE, ETSI-ITS, etc.) have well-defined information elements (IEs) for lanes, including conventions for lane numbering. For example, in SAE, a GenericLane data field includes a LaneID (lane number) and LaneWidth (1 cm permitted resolution). In this case, if the intra-lane position data is obtained (at least in part) from an external source at block 405, the intra-lane position data may be transported using one or more lane-specific IEs, with some examples shown in Table 1 as follows:

TABLE 1

| Data Frame | Data Element | Description |
| --- | --- | --- |
| LanePosition | LaneID | Lane number |
|  | IntraLanePositionReference | Binary value<br>0 = Left<br>1 = Right |
|  | IntraLaneDistance | Distance of vehicle body axis center from lane edge to the side referenced in IntraLanePositionReference Integer (0 . . . 1023) - units of 1 cm Maximum value 10.23 m |

In Table 1, vehicle position is defined using the ISO-8855 vehicle body axes coordinate system.

At block 410, the vehicle (e.g., communication interface 220, etc.) communicates intra-lane position data with one or more neighboring entities that indicates at least one lateral distance between at least one side of a primary vehicle and at least one lane reference point. In some designs, block 410 comprises a transmission of at least some part of the intra-lane position data obtained at optional block 405. In other designs, block 410 comprises reception of intra-lane position data from some other entity (e.g., a neighboring vehicle or RSU). In yet other designs, block 410 comprises both transmission of at least some part of the intra-lane position data obtained at optional block 405 as well as reception of intra-lane position data from some other entity (e.g., a neighboring vehicle or RSU). The 'primary' vehicle at block 410 may correspond to the vehicle that performed block 410 in some aspects, i.e., the vehicle may communicate (e.g., receive or transmit) its own relative intra-lane position data. However, it is also possible for the vehicle to communicate (e.g., receive or transmit) intra-lane position data for another vehicle, in which case the other vehicle is the 'primary' vehicle.

In a first example, the ranging mechanism(s) used to measure or derive the intra-lane position data may include one or more sensors among the radar-camera sensor module 120 of the vehicle. These sensors may include (but are not limited to) any of a camera, a light detector, a SONAR detector, a RADAR detector, a LIDAR detector, and/or an infrared detector. In this case, at block 410, the vehicle may communicate the intra-lane position data by transmitting (e.g., directly transmitting over a V2X connection) the intra-lane position data to the neighboring entit(ies) (e.g., a nearby RSU, one or more neighboring vehicles, etc.).

In a second example, the ranging mechanism(s) used to measure or derive the intra-lane position data may include one or more sensors among the radar-camera sensor module 120 of a neighboring vehicle. These sensors may include (but are not limited to) any of a camera, a light detector, a SONAR detector, a RADAR detector, a LIDAR detector, and/or an infrared detector. In this case, at block 410, the vehicle may communicate the intra-lane position data by receiving (e.g., directly receiving over a V2X connection) the intra-lane position data from that neighboring vehicle. In some designs, the RADAR detector may comprise a ground RADAR, which may facilitate determination of the vehicle's lateral position based on map information without relying upon detection (e.g., based on captured image data) of the lane marker(s). In other designs, the ground RADAR may be configured to detect the lane marker(s).

In a third example, the short-range ranging mechanism(s) used to measure or derive the intra-lane position data may include one or more sensors among the sensor module 350 of the RSU 170. In this case, at block 410, the vehicle may communicate the intra-lane position data by receiving (e.g., directly receiving over a V2X connection) the intra-lane position data from the RSU 170.

In a fourth example, the ranging mechanism(s) may include any combination of sensors of the vehicle, the neighboring vehicle(s), and/or the RSU 170. These sensors may include (but are not limited to) any of a camera, a light detector, a SONAR detector, a RADAR detector, a LIDAR detector, and/or an infrared detector.

Still referring to block 410 of FIG. 4, in some aspects, the vehicle may measure and/or derive its own intra-lane position data, such that the vehicle corresponds to the primary vehicle for which the lateral distance(s) are determined. In other aspects, a neighboring entity (e.g., another vehicle or an RSU) may measure and/or derive the vehicle's intra-lane position data using its own respective sensors. In other aspects, the vehicle may measure and/or derive its own intra-lane position data while the neighboring entity also (redundantly) measures and/or derives the vehicle's intra-lane position using its own respective sensors. In one embodiment, a first vehicle may be in the same lane as a second vehicle, and ahead of the second vehicle. Using one or more sensors such as RADAR, LIDAR, camera(s) and/or ultrasound, the first vehicle may determine the relative lateral and longitudinal position of the second vehicle, and in combination with mapping information and/or lane marker detection, may determine the intra-lane position of the first vehicle. In another embodiment, a first vehicle traveling on a multi-lane roadway in a lane adjacent to a second vehicle may determine the relative lateral and longitudinal position of the second vehicle, and in combination with knowledge of mapping information and/or lane marker detection may determine the intra-lane position of the first vehicle. In other designs, infrastructure components, such as RSUs, may be equipped with accurate sensors and may be able to determine vehicle intra-lane position (e.g., near intersections, on-ramps, etc.). In an example, the redundant intra-lane position data may be received at the vehicle as part of block 410. Once obtained, the redundant intra-lane position data can be averaged or otherwise evaluated by the vehicle in addition to its own self-obtained intra-lane position data. Hence, as will be discussed below in more detail, one or more vehicles may measure and/or derive their own intra-lane position data, one or more vehicles (or RSUs) may measure and/or derive the intra-lane position data of other vehicle(s), or any combination thereof.

Still referring to block 410 of FIG. 4, the at least one lane reference point may be defined in a variety of ways. In some aspects, the at least one lane reference point may include at least one lane edge. A lane "edge" may itself be defined in a variety of ways, such as based upon a lane line or lane divider (e.g., a shoulder line, a dotted lane divider, a double-yellow or a single-yellow lane divider, etc.), a curb, a road edge, a rumble strip, a median, a cone, or any combination thereof. In yet another example, the at least one lane reference point may include at least one neighboring vehicle of the primary vehicle. In this case, the lateral distance(s) relative to neighboring vehicle(s) is determined, instead of (or in addition) to the lateral distance(s) to 'fixed' lane reference points.

Referring to FIG. 4, at block 420, the vehicle optionally implements one or more actions in association with one or more neighboring vehicles based at least in part upon the intra-lane position data. In an example, block 420 is optional because the intra-lane position data may indicate that the relative positions of the vehicle and the neighboring vehicle(s) is already acceptable, such that no action need be taken.

In an example of block 420, the one or more actions may include maneuvering the vehicle so as to achieve or maintain a threshold inter-vehicle lateral spacing between the vehicle and at least one neighboring vehicle. In a further example, the one or more actions include maneuvering the vehicle in coordination with maneuvering at least one neighboring vehicle of at least one of the one or more neighboring entities to achieve or maintain a threshold inter-vehicle lateral spacing between the vehicle and the at least one neighboring vehicle.

In an example of block 420, the one or more actions may be implemented by the vehicle while the vehicle is operating in an autonomous driving mode. For example, with reference to FIG. 1B, assume that vehicles 130-140 are required to increase their lateral separation by 20 inches. This can be achieved by either vehicle moving the full 20 inches away from the other (in a lateral direction), or by each vehicle moving away from the other (e.g., vehicle 130 moves left by 10" while vehicle 140 moves right by 10", vehicle 130 moves left by 1" while vehicle 140 moves right by 19", etc.). If only one vehicle is required to move, it will be appreciated that such movement can theoretically be implemented in a non-coordinated manner. In this case, non-coordinated lane movements can be implemented even with respect to legacy vehicles that are incapable of an autonomous driving mode and/or vehicles that are capable of V2X communication but are not currently being driven in accordance with an autonomous driving mode.

Figure 5A:
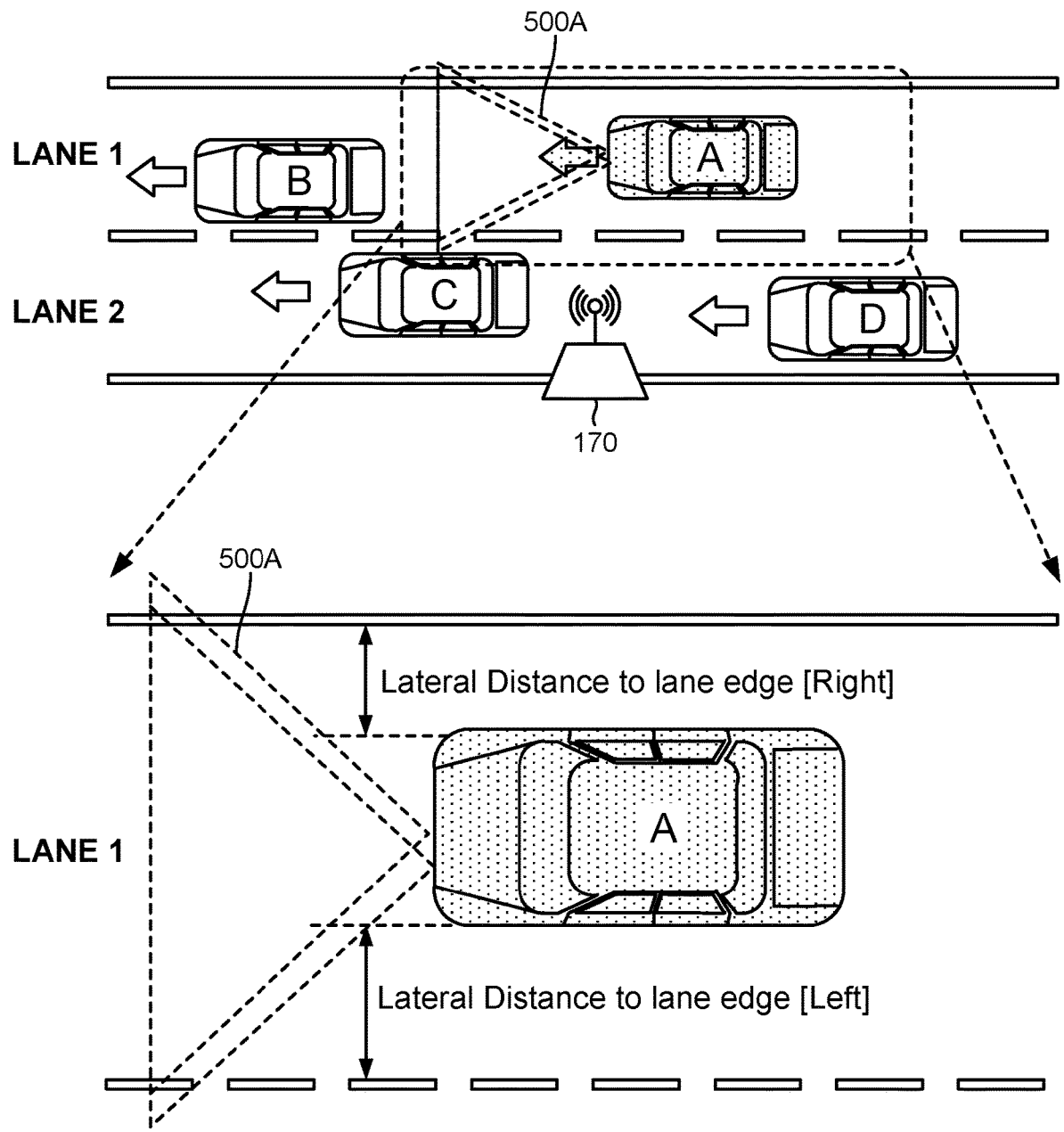
FIG. 5A illustrates an example implementation of the process of FIG. 4 in accordance with an aspect of the disclosure.

FIG. 5A illustrates an example implementation of the process of FIG. 4 in accordance with an aspect of the disclosure. In FIG. 5A, Vehicles A and B are in Lane 1, and Vehicles C and D are in Lane 2. The primary vehicle in this specific illustration corresponds to Vehicle A, whereby Vehicle A uses its own sensors to derive its relative intra-lane position data. In the example of FIG. 5A, coverage zone(s) 500A are used to derive a "right" lateral distance from a right-side of Vehicle A to a shoulder lane line and a "left" lateral distance from a left-side of Vehicle A to a dotted lane line. In one specific example, the left and right lateral distances can be derived using a set of forward facing cameras (e.g., Lane Keep Assist).

Figure 5B:
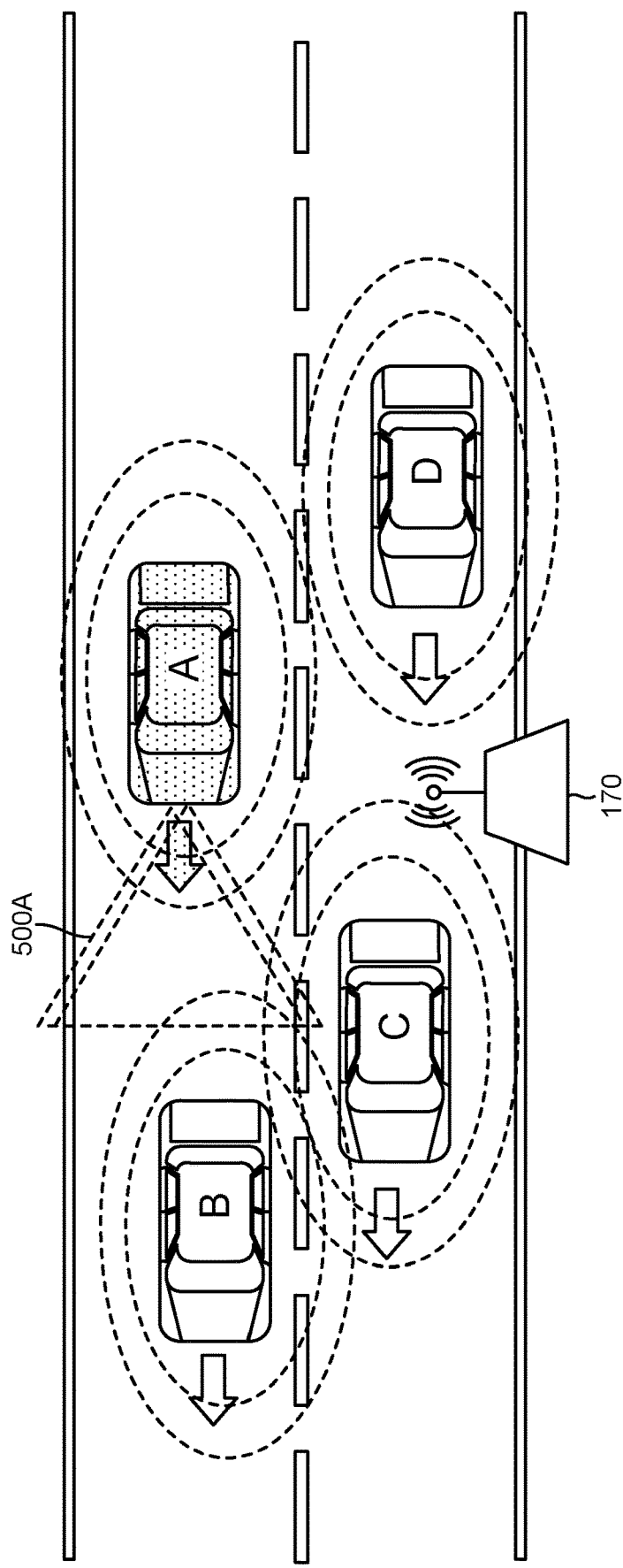
FIG. 5B illustrates a group of vehicles and an RSU in communication with each other in accordance with an aspect of the disclosure.

FIG. 5B illustrates Vehicles A-D and RSU 170 in communication with each other (e.g., via V2X) in accordance with an aspect of the disclosure.

Figure 5C:
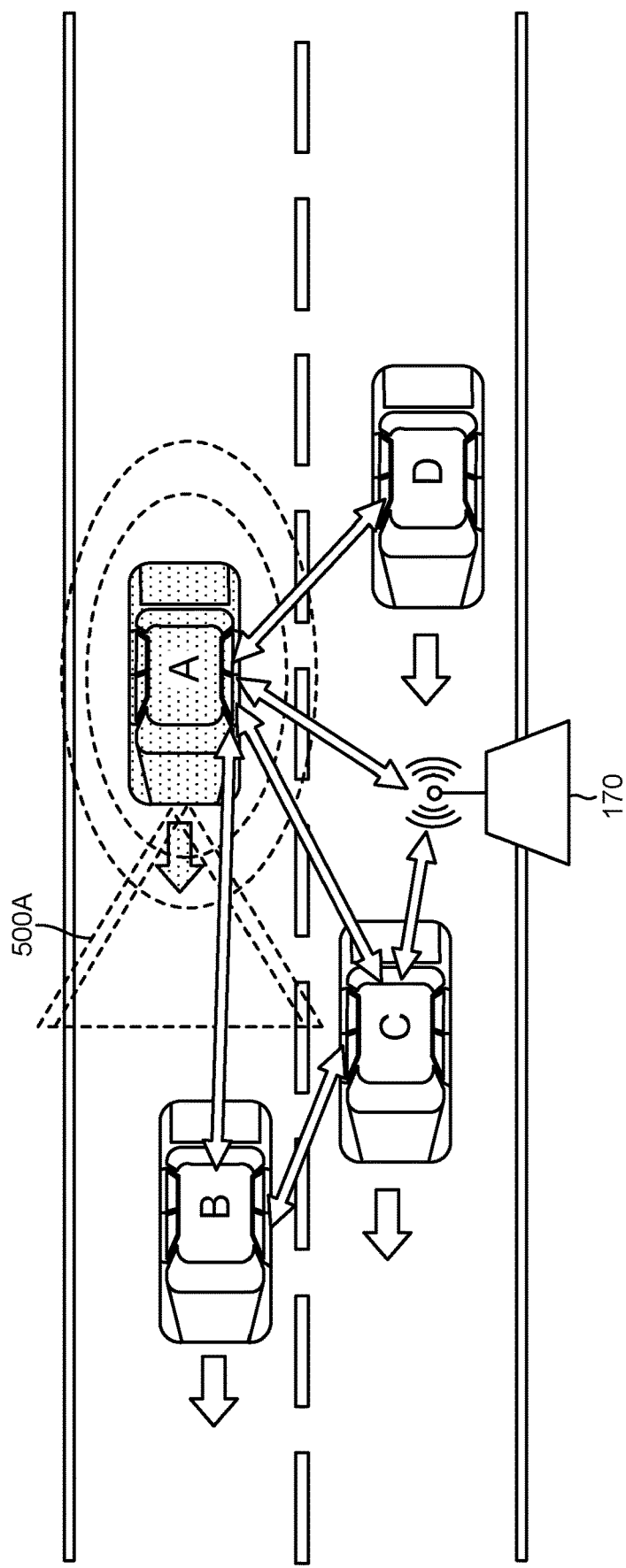
FIG. 5C illustrates a group of vehicles and an RSU in communication with each other in accordance with another aspect of the disclosure.

FIG. 5C illustrates Vehicles A-D and RSU 170 in communication with each other (e.g., via V2X) in accordance with a further aspect of the disclosure. In FIG. 5C, Vehicle A is connected directly to Vehicles B, C, D and RSU 170, Vehicle B is connected directly to Vehicles A and C, Vehicle C is connected directly to Vehicles A, B and RSU 170, Vehicle D is connected directly to Vehicle A only, and RSU 170 is connected directly to Vehicles A and C. If no direct connection is possible, the various entities can still be indirectly communicatively coupled as part of a VANET (or mesh-type network).

Referring to FIG. 5C, Vehicle A's intra-lane position data may be communicated to Vehicles B-D as well as RSU 170 via unicast, multicast and/or broadcast protocols. In FIG. 5C, the neighboring entities that are directly or indirectly exchanging intra-lane position data with each other (e.g., via V2V, V2I, I2V, etc.) may comprise a mix of both vehicles (e.g., Vehicles A-D) and infrastructure devices (e.g., RSU 170). In some cases, Vehicles A-D may be referred to as a 'platoon' of vehicles in this context. It will be appreciated that Vehicles B-D may also transmit their own intra-lane position data in some aspects. Also, one or more of the various entities may transmit the intra-lane position data for other vehicle(s) as noted above. The intra-lane position data exchanged in this manner may be used to various purposes, such as keeping a platoon composed of like vehicles laterally aligned so as to reduce drag.

Figure 6:
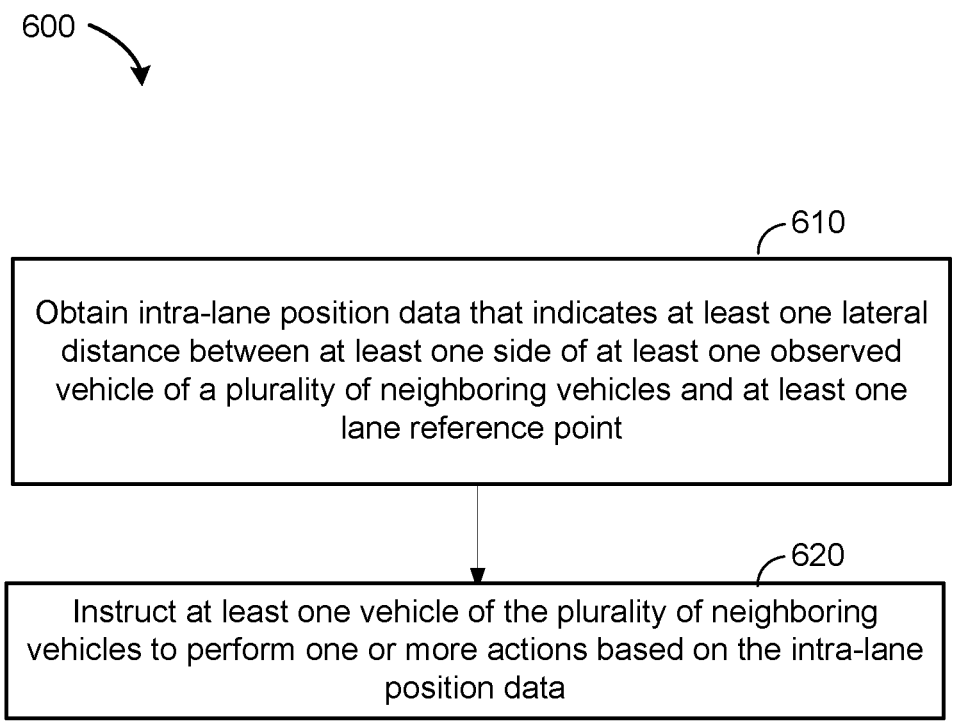
FIG. 6 is a flow diagram illustrating an example method of leveraging intra-lane position data in accordance with an aspect of the present disclosure.

FIG. 6 is a flow diagram illustrating an example method 600 of leveraging intra-lane position data in accordance with an aspect of the present disclosure. The method 600 may be performed, for example, by a vehicle management device. The vehicle management device can correspond to a vehicle (or more specifically, by a computer or OBU on-board a vehicle, which may be referred to as a so-called 'control' vehicle) or an RSU (such as RSU 170 described above with respect to FIGS. 1B and 3).

Referring to FIG. 6, at block 610, the vehicle management device obtains intra-lane position data that indicates at least one lateral distance between at least one side of at least one observed vehicle of a plurality of neighboring vehicles and at least one lane reference point. In an example, at block 610, the vehicle management device may locally measure and derive at least part of the intra-lane position data, the vehicle management device may receive (e.g., via a direct wireless connection) at least part of the intra-lane position data from at least one external entity (e.g., a neighboring RSU or vehicle), or a combination thereof (e.g., some of the intra-lane position data is locally measured/derived, while other of the intra-lane position data is communicated to the vehicle management device). At block 620, the vehicle management device instructs at least one vehicle of the plurality of neighboring vehicles to perform one or more actions based on the intra-lane position data. In an example, the instruction(s) at block 620 may be communicated to an external vehicle, although in an implementation where the vehicle management device itself corresponds to a vehicle, the instruction(s) can include internal instruction(s) that are locally executed by that vehicle.

Figure 7:
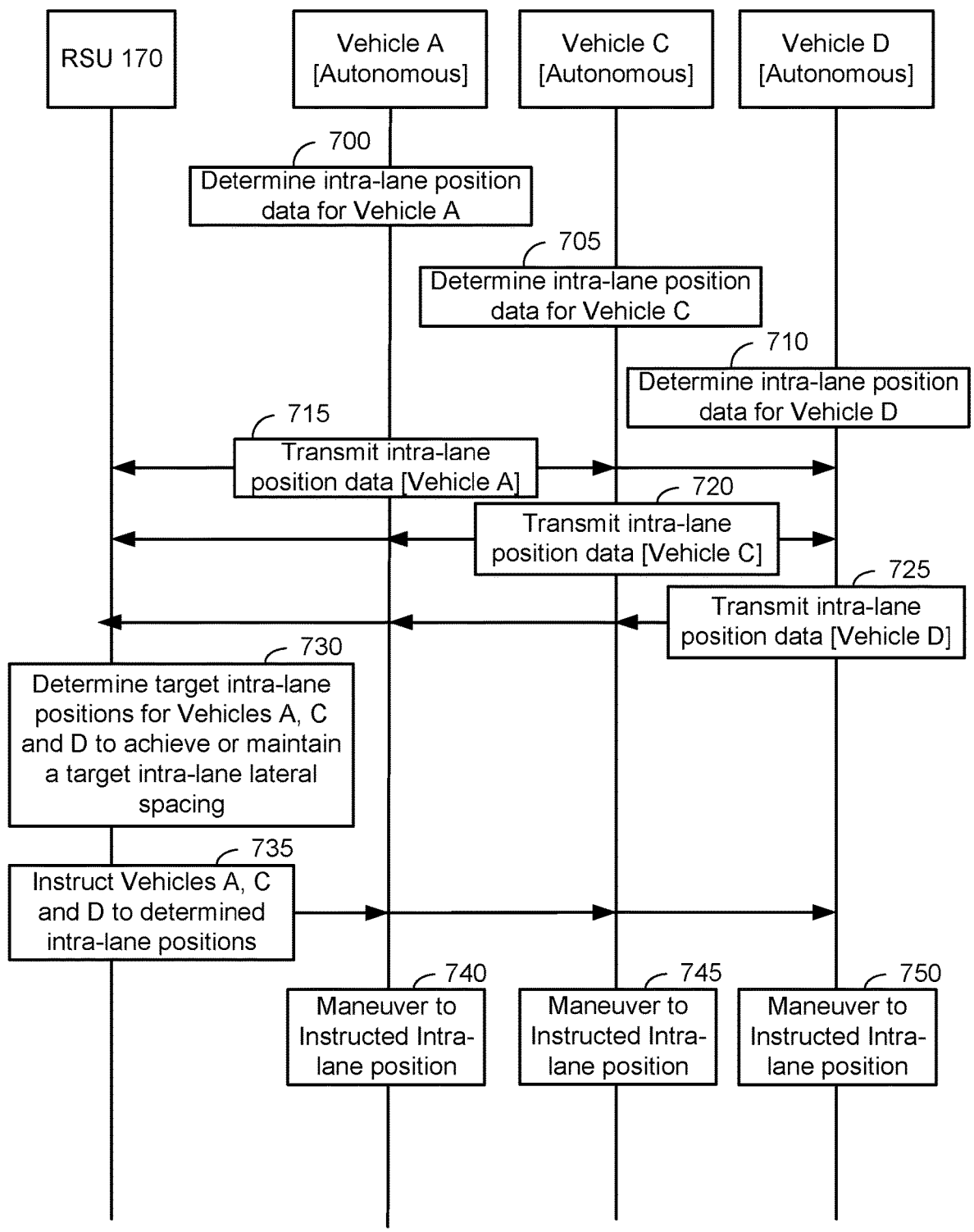
FIG. 7 illustrates example implementations of the processes of FIGS. 4 and 6, respectively, in accordance with an aspect of the disclosure.

FIG. 7 illustrates example implementations of the processes 400 and 600 of FIGS. 4 and 6, respectively, in accordance with an aspect of the disclosure. In FIG. 7, it is assumed that Vehicles A, C and D are arranged as shown in FIG. 5A in close proximity to RSU 170. In the aspect of FIG. 7, each of Vehicles A, C and D are configured as autonomous-capable vehicles that are currently engaged in an autonomous driving mode (e.g., an OBU is in control of Vehicles A, C and D instead of a human driver). In an example, each of Vehicles A, C and D may be configured similarly to vehicle 100 as described above with respect to FIGS. 1B-2. In FIG. 7, the vehicle management device that executes the process 600 of FIG. 6 corresponds to RSU 170.

Referring to FIG. 7, Vehicle A determines intra-lane position data for Vehicle A (block 700), Vehicle C determines intra-lane position data for Vehicle C (block 705), and Vehicle D determines intra-lane position data for Vehicle D (block 710). In an example, blocks 700-710 may be implemented based on local ranging measurements performed at Vehicles A, C and D, respectively (e.g., via cameras, light detectors, SONAR/RADAR/LIDAR detectors, infrared detectors, etc.). Vehicle A transmits its intra-lane position data to Vehicles C, D and RSU 170 (block 715), Vehicle C transmits its intra-lane position data to Vehicles A, D and RSU 170 (block 720), and VehicleD transmits its intra-lane position data to Vehicles A, C and RSU 170 (block 725). In an example, each of blocks 715-725 is an example implementation (from Vehicle and RSU perspectives) of block 410 of FIG. 4 as well as (from the RSU perspective) block 610 of FIG. 6.

Referring to FIG. 7, at block 730, RSU 170 determines target intra-lane positions for Vehicles A, C and D to achieve or maintain a target inter-vehicle lateral spacing between the respective vehicles. In an example, the target inter-vehicle lateral spacing can be a fixed value (e.g., 3 feet, 4 feet, etc.) or can be based on road-specific conditions such as lane width, weather, speed limit, road accident history, etc. At block 735 (e.g., as in 620 of FIG. 6), RSU 170 instructs Vehicles A, C and D to maneuver to their respective target intra-lane positions determined at 730. Vehicle A receives the instruction from RSU 170 and autonomously maneuvers to its target intra-lane position (block 740), Vehicle C receives the instruction from RSU 170 and autonomously maneuvers to its target intra-lane position (block 745), and Vehicle D receives the instruction from RSU 170 and autonomously maneuvers to its target intra-lane position (block 750). In an example, each of blocks 740-750 is an example implementation of 420 of FIG. 4.

Figure 8:
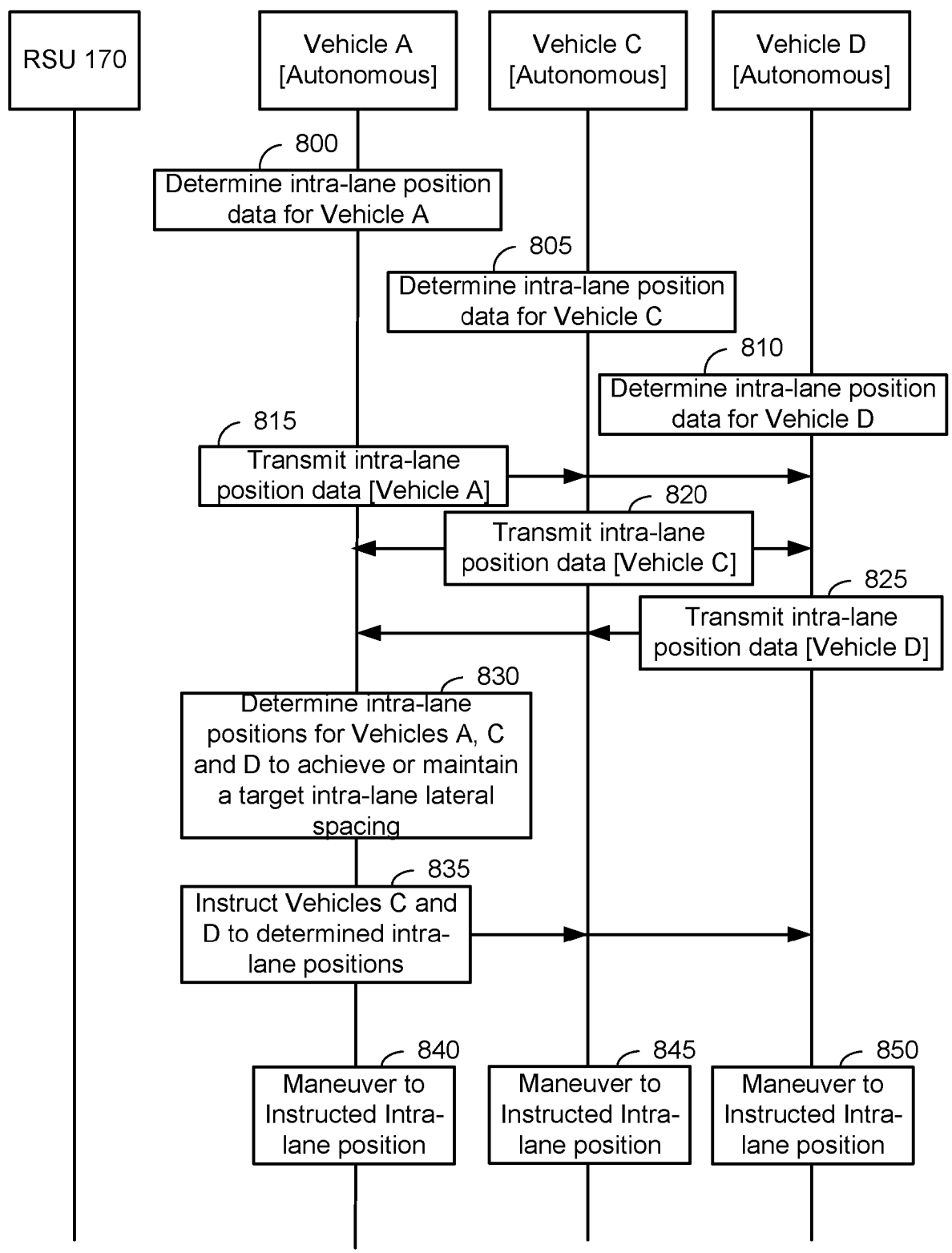
FIG. 8 illustrates example implementations of the processes of FIGS. 4 and 6, respectively, in accordance with another aspect of the disclosure.

FIG. 8 illustrates example implementations of the processes 400 and 600 of FIGS. 4 and 6, respectively, in accordance with another aspect of the disclosure. The process of FIG. 8 is similar to the process of FIG. 7, except that the vehicle management device that executes the process 600 of FIG. 6 corresponds to Vehicle A instead of RSU 170.

Referring to FIG. 8, Vehicle A determines intra-lane position data for Vehicle A (block 800), Vehicle C determines intra-lane position data for Vehicle C (block 805), and Vehicle D determines intra-lane position data for Vehicle D (block 810). In an example, blocks 800-810 may be implemented based on local ranging measurements performed at Vehicles A, C and D, respectively (e.g., via cameras, light detectors, SONAR/RADAR/LIDAR detectors, infrared detectors, etc.). Vehicle A transmits its intra-lane position data to Vehicles C and D (block 815), Vehicle C transmits its intra-lane position data to Vehicles A and D (block 820), and Vehicle D transmits its intra-lane position data to Vehicles A and C (block 825). In an example, each of blocks 815-825 is an example implementation of block 410 of FIG. 4 as well as (from the Vehicle A's perspective) block 610 of FIG. 6.

Referring to FIG. 8, at block 830, Vehicle A determines target intra-lane positions for Vehicles A, C and D to achieve or maintain a target inter-vehicle lateral spacing between the respective vehicles. In an example, the target inter-vehicle lateral spacing can be a fixed value (e.g., 3 feet, 4 feet, etc.) or can be based on road-specific conditions such as lane width, weather, speed limit, road accident history, etc. At block 835 (e.g., as in 620 of FIG. 6), Vehicle A instructs Vehicles C and D to maneuver to their respective target intra-lane positions determined at 830. While not shown explicitly in FIG. 8, Vehicle A may also issue an internal instruction to maneuver itself to a respective target intra-lane position as well. Vehicle A receives its (internal) instruction and autonomously maneuvers to its target intra-lane position (block 840), Vehicle C receives the instruction from Vehicle A and autonomously maneuvers to its target intra-lane position (block 845), and Vehicle D receives the instruction from Vehicle A and autonomously maneuvers to its target intra-lane position (block 850). In an example, each of blocks 840-850 is an example implementation of 420 of FIG. 4.

Figure 9:
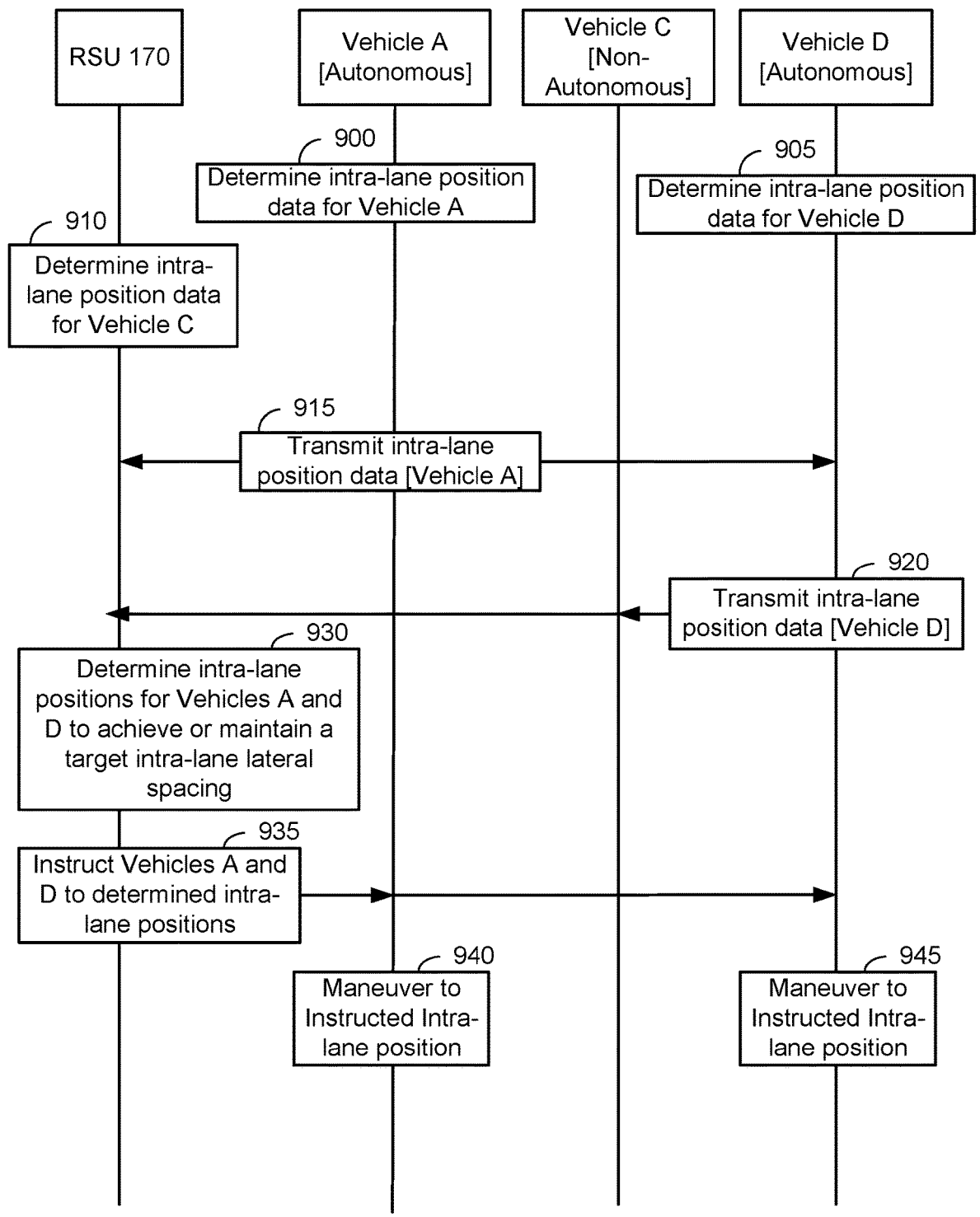
FIG. 9 illustrates example implementations of the processes of FIGS. 4 and 6, respectively, in accordance with another aspect of the disclosure.

FIG. 9 illustrates example implementations of the processes 400 and 600 of FIGS. 4 and 6, respectively, in accordance with another aspect of the disclosure. The process of FIG. 9 is similar to the process of FIG. 7, except that only Vehicles A and D are engaged in an autonomous driving mode, while Vehicle C is operating in accordance with a non-autonomous mode (i.e., operated by a human driver). Vehicle C may either be a 'legacy' vehicle that is incapable of engaging in an autonomous driving mode, although it is also possible for Vehicle C to be capable of engaging in an autonomous driving mode without the autonomous driving mode being currently engaged.

Referring to FIG. 9, Vehicle A determines intra-lane position data for Vehicle A (block 900), and Vehicle D determines intra-lane position data for Vehicle D (block 905). In an example, blocks 900-905 may be implemented based on local ranging measurements performed at Vehicles A and D, respectively (e.g., via cameras, light detectors, SONAR/RADAR/LIDAR detectors, infrared detectors, etc.). At block 910, RSU 170 determines intra-lane position data for Vehicle C (e.g., via scanning of Vehicle C using its own sensors, including but not limited to cameras, light detectors, SONAR/RADAR/LIDAR detectors, infrared detectors, etc.). Vehicle A transmits its intra-lane position data to Vehicle D and RSU 170 (block 915), and Vehicle D transmits its intra-lane position data to Vehicle A and RSU 170 (block 920). In an example, each of blocks 915-920 is an example implementation (from Vehicle and RSU perspectives) of block 410 of FIG. 4 as well as (from the RSU perspective) block 610 of FIG. 6. While not shown in FIG. 9, it is also possible for Vehicles A and/or D to scan Vehicle C to determine Vehicle C's respective intra-lane position data, and then convey the scanned intra-lane position data for Vehicle C to the vehicle management device (RSU 170 in this aspect).

Referring to FIG. 9, at block 930, RSU 170 determines target intra-lane positions for Vehicles A and D to achieve or maintain a target inter-vehicle lateral spacing between the respective vehicles. Because Vehicle C is not engaged in the autonomous driving mode, RSU 170 cannot control Vehicle C and thereby may determine to maneuver Vehicles A and/or D differently than in block 730 of FIG. 7 (e.g., a larger target inter-vehicle lateral spacing between Vehicles A and D may be used due to Vehicle C being operated by a human driver, etc.). At block 935 (e.g., as in 620 of FIG. 6), RSU 170 instructs Vehicles A and D to maneuver to their respective target intra-lane positions determined at 930. Vehicle A receives the instruction from RSU 170 and autonomously maneuvers to its target intra-lane position (block 940), and Vehicle D receives the instruction from RSU 170 and autonomously maneuvers to its target intra-lane position (block 945). In an example, each of blocks 940-945 is an example implementation of 420 of FIG. 4.

Figure 10:
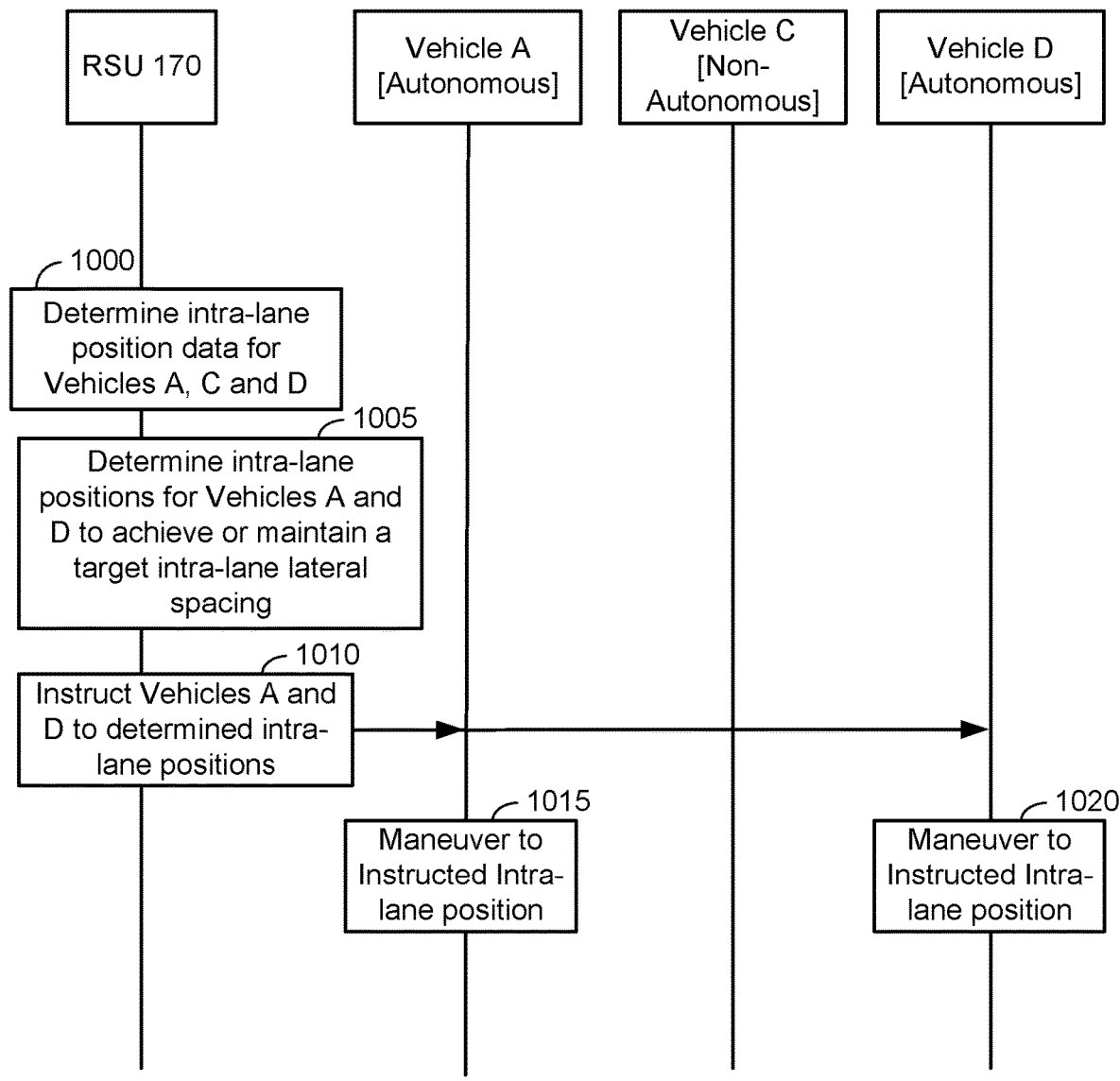
FIG. 10 illustrates example implementations of the process of FIG. 6 in accordance with another aspect of the disclosure.

FIG. 10 illustrates example implementations of the process 600 of FIG. 6 in accordance with another aspect of the disclosure. The process of FIG. 10 is similar to the process of FIG. 9, except that RSU 170 performs all active scanning to derive the respective intra-lane position data of Vehicles A, C and D irrespective of whether the respective vehicles are engaged in autonomous or non-autonomous driving modes. Moreover, in FIG. 10, the RSU 170 determines, but need not communicate, the intra-lane position data, such that the process of FIG. 10 does not necessarily execute block 410 of FIG. 4.

Referring to FIG. 10, at block 1000, RSU 170 determines intra-lane position data for Vehicles A, C and D (e.g., via scanning of each respective vehicle using its own sensors, including but not limited to cameras, light detectors, SONAR/RADAR/LIDAR detectors, infrared detectors, etc.). In an example, block 1000 is an example implementation of block 610 of FIG. 6. While not shown in FIG. 10, it is also possible for Vehicles A, C and/or D to separately determine intra-lane position data, and then convey the separately determined intra-lane position data to the vehicle management device (RSU 170 in this aspect).

Referring to FIG. 10, at block 1005, RSU 170 determines target intra-lane positions for Vehicles A and D to achieve or maintain a target inter-vehicle lateral spacing between the respective vehicles. Similar to 930 of FIG. 9, because Vehicle C is not engaged in the autonomous driving mode, RSU 170 cannot control Vehicle C and thereby may determine to maneuver Vehicles A and/or D differently than in block 730 of FIG. 7 (e.g., a larger target inter-vehicle lateral spacing between Vehicles A and D may be used due to Vehicle C being operated by a human driver, etc.). At block 1010 (e.g., as in 620 of FIG. 6), RSU 170 instructs Vehicles A and D to maneuver to their respective target intra-lane positions determined at 1005. Vehicle A receives the instruction from RSU 170 and autonomously maneuvers to its target intra-lane position (block 1015), and Vehicle D receives the instruction from RSU 170 and autonomously maneuvers to its target intra-lane position (block 1020). In an example, each of blocks 1015 and 1020 is an example implementation of 420 of FIG. 4.

Figure 11:
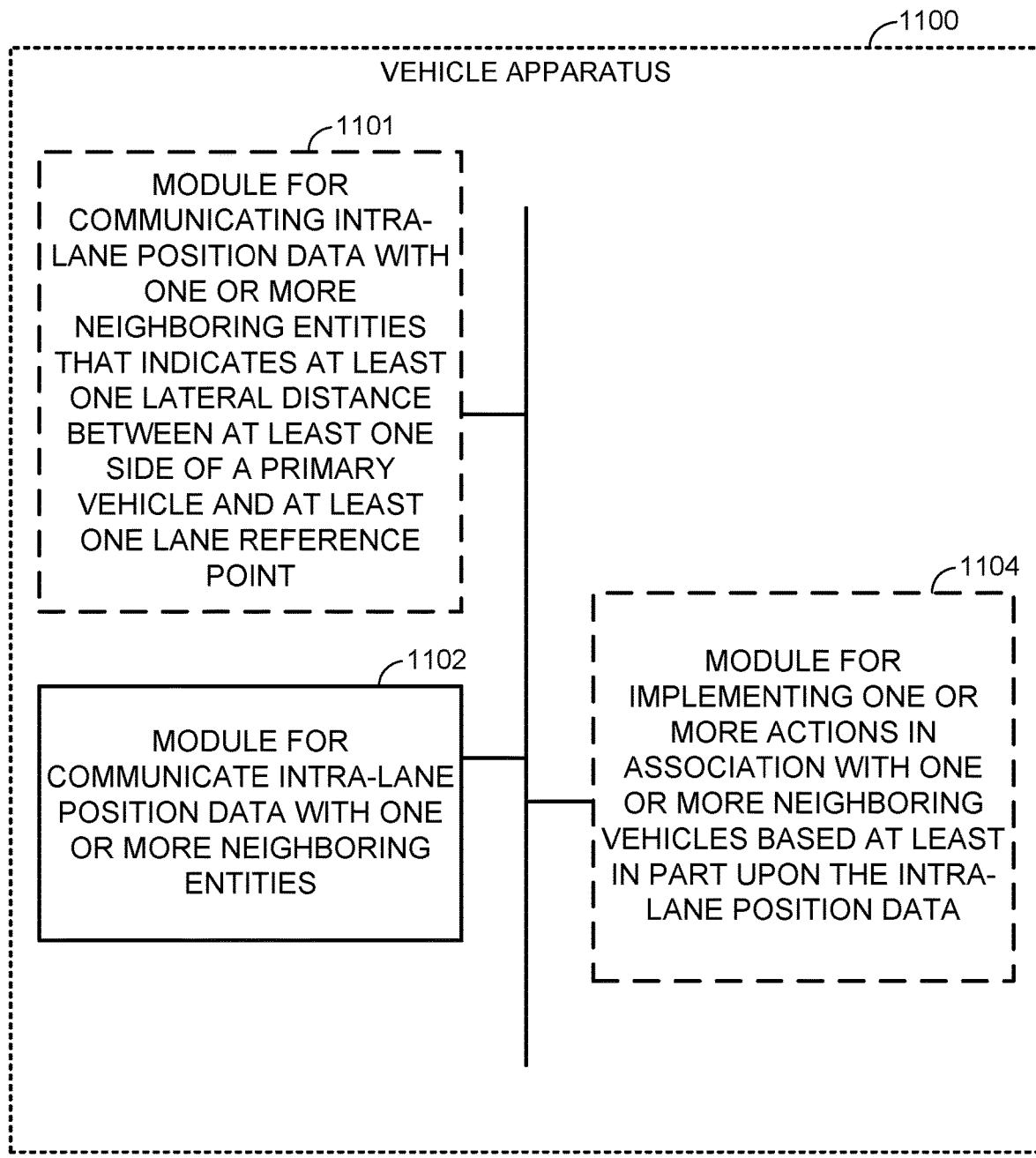
FIG. 11 illustrates an example vehicle apparatus for implementing the process of FIG. 4 represented as a series of interrelated functional modules in accordance with an aspect of the disclosure.

FIG. 11 illustrates an example vehicle apparatus 1100 for implementing the process 400 of FIG. 4 represented as a series of interrelated functional modules in accordance with an aspect of the disclosure. In the illustrated example, the vehicle apparatus 1100 includes (optionally) a module for obtaining 1101, a module for communicating 1102, and (optionally) a module for implementing 1104.

The (optional) module for obtaining 1101 may be configured to obtain intra-lane position data relative to the vehicle, the intra-lane position data indicating at least one lateral distance between at least one side of a primary vehicle and at least one lane reference point (e.g., 405 of FIG. 4). The module for communicating 1102 may be configured to communicate intra-lane position data (e.g., the intra-lane position data obtained by optional module 1101 or other intra-lane position data) with one or more neighboring entities that indicates at least one lateral distance between at least one side of a primary vehicle and at least one lane reference point (e.g., 410 of FIG. 4). The (optional) module for implementing 1104 may be configured to implement one or more actions in association with one or more neighboring vehicles based at least in part upon the intra-lane position data (e.g., 420 of FIG. 4).

Figure 12:
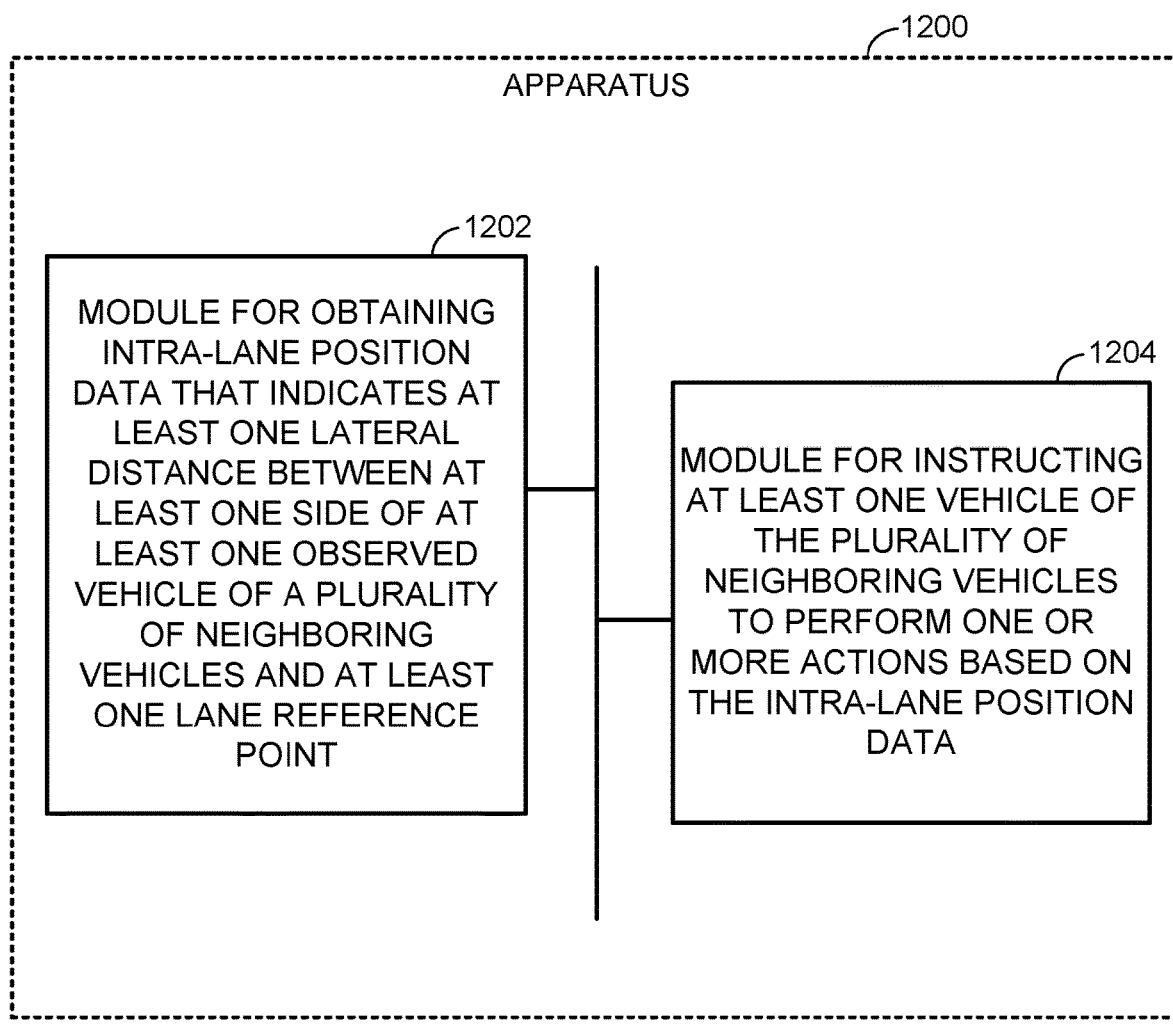
FIG. 12 illustrates an example vehicle apparatus for implementing the process of FIG. 6 represented as a series of interrelated functional modules in accordance with an aspect of the disclosure.

FIG. 12 illustrates an example vehicle apparatus 1200 for implementing the process 600 of FIG. 6 represented as a series of interrelated functional modules in accordance with an aspect of the disclosure. In the illustrated example, the apparatus 1200 includes a module for obtaining 1202, and a module for instructing 1204.

The module for obtaining 1202 may be configured to obtain intra-lane position data that indicates at least one lateral distance between at least one side of at least one observed vehicle of a plurality of neighboring vehicles and at least one lane reference point (e.g., 610 of FIG. 6). The module for instructing 1204 may be configured to instruct at least one vehicle of the plurality of neighboring vehicles to perform one or more actions based on the intra-lane position data (e.g., 620 of FIG. 6).

The functionality of the modules of FIGS. 11-12 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 11-12, as well as other components and functions described herein, may be implemented using any suitable means. Such means also may be implemented, at least in part, using corresponding structure as taught herein. For example, the components described above in conjunction with the "module for" components of FIGS. 11-12 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well as in sequences of actions that may be represented by pseudocode. For example, the components and functions represented by FIGS. 11-12 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying the methods described herein.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of operating a vehicle, comprising:
obtaining, based on sensor data from one or more vehicle sensors communicatively coupled to the vehicle, intra-lane position data relative to the vehicle, the intra-lane position data indicating at least one lateral distance between at least one side of a primary vehicle and at least one lane reference point; and
transmitting the intra-lane position data to one or more neighboring entities,
wherein an entirety of the primary vehicle is positioned inside of a respective lane and the at least one lateral distance comprises at least one intra-lane lateral distance from the at least one side of the primary vehicle to the at least one lane reference point of the respective lane.

2. The method of claim 1, further comprising:
implementing one or more actions in association with one or more neighboring vehicles based at least in part upon the intra-lane position data.

3. The method of claim 2, wherein the implementing is performed in coordination between the vehicle and at least one neighboring vehicle.

4. The method of claim 3, wherein the implementing is performed in coordination between the vehicle and the at least one neighboring vehicle based in part upon the vehicle and the at least one neighboring vehicle being operated in accordance with an autonomous driving mode.

5. The method of claim 2, wherein the implementing is performed at the vehicle without coordination with the at least one neighboring vehicle of the one or more neighboring entities.

6. The method of claim 5, wherein the implementing is performed without coordination between the vehicle and the at least one neighboring vehicle based in part upon the at least one neighboring vehicle being operated by a human driver in a non-autonomous driving mode.

7. The method of claim 2, wherein the one or more actions include maneuvering the vehicle so as to achieve or maintain a target inter-vehicle lateral spacing between the vehicle and at least one neighboring vehicle.

8. The method of claim 2, wherein the one or more actions include maneuvering the vehicle in coordination with maneuvering at least one neighboring vehicle of at least one of the one or more neighboring entities to achieve or maintain a target inter-vehicle lateral spacing between the vehicle and the at least one neighboring vehicle.

9. The method of claim 1, wherein the one or more neighboring entities include at least one neighboring vehicle.

10. The method of claim 1, wherein the one or more neighboring entities include at least one roadside unit (RSU) or a central computing device.

11. The method of claim 1, wherein the one or more vehicle sensors include at least one of a camera, light detector, sound navigation and ranging (SONAR) detector, radio detection and ranging (RADAR) detector, light detection and ranging (LIDAR) detector, or infrared detector.

12. The method of claim 1, wherein the intra-lane position data is derived via one or more ranging mechanisms.

13. The method of claim 1, wherein the at least one lane reference point includes at least one lane edge.

14. The method of claim 13, wherein the at least one lane edge is defined based upon one or more lane lines, one or more curbs, one or more road edges, one or more rumble strips, one or more medians, one or more lane dividers, one or more cones, or any combination thereof.

15. The method of claim 1, wherein the at least one lane reference point includes at least one neighboring vehicle of the primary vehicle.

16. A vehicle, comprising:
a memory;
at least one communications interface;
one or more vehicle sensors; and
at least one processor communicatively coupled to the memory, the at least one communications interface, and the one or more vehicle sensors, the at least one processor configured to:
obtain, based on sensor data from the one or more vehicle sensors, intra-lane position data relative to the vehicle, the intra-lane position data indicating at least one lateral distance between at least one side of a primary vehicle and at least one lane reference point; and
transmit, via the at least one communications interface, the intra-lane position data to one or more neighboring entities,
wherein an entirety of the primary vehicle is positioned inside of a respective lane and the at least one lateral distance comprises at least one intra-lane lateral distance from the at least one side of the primary vehicle to the at least one lane reference point.

17. The vehicle of claim 16, wherein the at least one processor is further configured to implement one or more actions in association with one or more neighboring vehicles based at least in part upon the intra-lane position data.

18. The vehicle of claim 17, wherein the one or more actions are performed in coordination between the vehicle and at least one neighboring vehicle.

19. The vehicle of claim 18, wherein the one or more actions are performed in coordination between the vehicle and the at least one neighboring vehicle based in part upon the vehicle and the at least one neighboring vehicle being operated in accordance with an autonomous driving mode.

20. The vehicle of claim 17, wherein the one or more actions are performed at the vehicle without coordination with the at least one neighboring vehicle of the one or more neighboring entities.

21. The vehicle of claim 17, wherein the one or more actions include maneuvering the vehicle so as to achieve or maintain a target inter-vehicle lateral spacing between the vehicle and at least one neighboring vehicle.

22. The vehicle of claim 17, wherein the one or more actions include maneuvering the vehicle in coordination with maneuvering at least one neighboring vehicle of at least one of the one or more neighboring entities to achieve or maintain a target inter-vehicle lateral spacing between the vehicle and the at least one neighboring vehicle.

23. The vehicle of claim 16,
wherein the one or more neighboring entities include at least one neighboring vehicle, or
wherein the one or more neighboring entities include at least one roadside unit (RSU) or a central computing device.

24. The vehicle of claim 16, wherein the one or more vehicle sensors include at least one of a camera, light detector, sound navigation and ranging (SONAR) detector, radio detection and ranging (RADAR) detector, light detection and ranging (LIDAR) detector, or infrared detector.

25. The vehicle of claim 16, wherein the intra-lane position data is derived via one or more ranging mechanisms.

26. The vehicle of claim 16,
wherein the at least one lane reference point includes at least one lane edge, or
wherein the at least one lane reference point includes at least one neighboring vehicle of the primary vehicle.

27. A vehicle of a vehicle, comprising:
means for obtaining, based on sensor data from one or more vehicle sensors communicatively coupled to the vehicle, intra-lane position data relative to the vehicle, the intra-lane position data indicating at least one lateral distance between at least one side of a primary vehicle and at least one lane reference point; and
means for transmitting the intra-lane position data to one or more neighboring entities
wherein an entirety of the primary vehicle is positioned inside of a respective lane and the at least one lateral distance comprises at least one intra-lane lateral distance from the at least one side of the primary vehicle to the at least one lane reference point.

28. The vehicle of claim 27, further comprising:
means for implementing one or more actions in association with one or more neighboring vehicles based at least in part upon the intra-lane position data.

29. A non-transitory computer-readable medium containing instructions stored thereon, which, when executed by a vehicle, cause the vehicle to perform operations, the instructions comprising:
at least one instruction to cause the vehicle to obtain, based on sensor data from one or more vehicle sensors communicatively coupled to the vehicle, intra-lane position data relative to the vehicle, the intra-lane position data indicating at least one lateral distance between at least one side of a primary vehicle and at least one lane reference point; and
at least one instruction to cause the vehicle to obtain transmit the intra-lane position data to one or more neighboring entities,
wherein an entirety of the primary vehicle is positioned inside of a respective lane and the at least one lateral distance comprises at least one intra-lane lateral distance from the at least one side of the primary vehicle to the at least one lane reference point.

30. The non-transitory computer-readable medium of claim 29, further comprising:
at least one instruction to cause the vehicle to implement one or more actions in association with one or more neighboring vehicles based at least in part upon the intra-lane position data.

\* \* \* \* \*